United States Patent [19]

Akeret

[11] 4,317,702

[45] Mar. 2, 1982

[54] RACK FOR STORING FUEL ASSEMBLY CLUSTERS IN A WATER PIT

[75] Inventor: Hans Akeret, Wiesendangen, Switzerland

[73] Assignee: Sulzer Brothers Limited, Winterthur, Switzerland

[21] Appl. No.: 67,703

[22] Filed: Aug. 17, 1979

[30] Foreign Application Priority Data

Aug. 17, 1978 [CH] Switzerland .................. 8752/78

[51] Int. Cl.³ .................. G21C 19/20; G21F 5/00
[52] U.S. Cl. .................. 376/272
[58] Field of Search .................. 176/30, 76, 78; 250/507

[56] References Cited

U.S. PATENT DOCUMENTS

| | | | |
|---|---|---|---|
| 4,042,828 | 8/1977 | Rubinstein | 250/507 |
| 4,088,897 | 5/1978 | Soot | 250/507 |
| 4,152,602 | 5/1979 | Kaminski | 250/507 |

*Primary Examiner*—Donald P. Walsh
*Attorney, Agent, or Firm*—Kenyon & Kenyon

[57] ABSTRACT

The rack is constructed of rack elements having square fuel assembly cluster-receiving tubes which are fastened to bed plates at a small distance. These bed plates are so small that they can be transported after assembly with the receiving tubes. By connecting adjacent bed plates at a fixed height in joint-fashion and by mutual bracing of the upper ends of the receiving tubes, the narrow and high rack elements are prevented from tipping over in the event of an earthquake.

9 Claims, 4 Drawing Figures

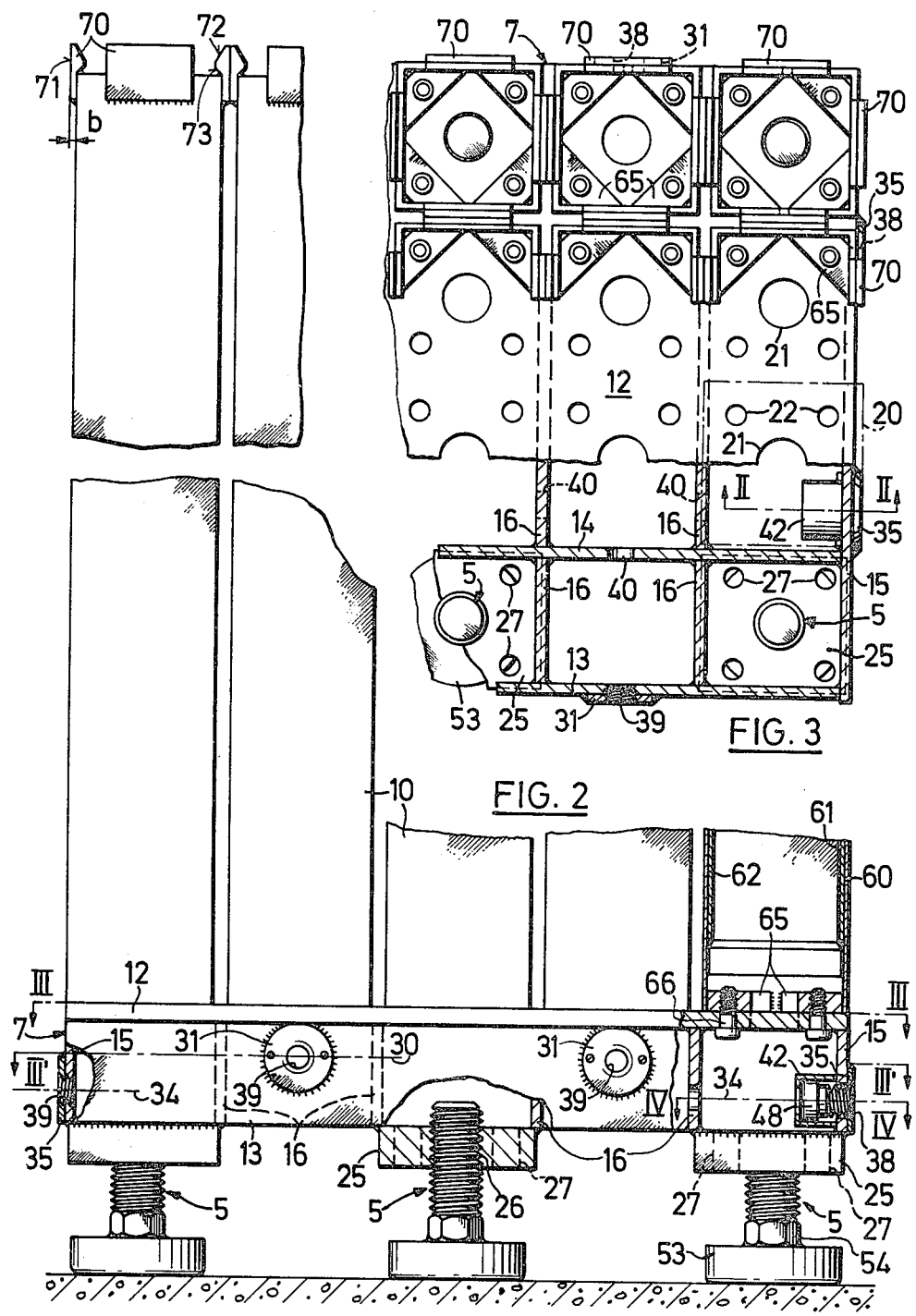

RACK FOR STORING FUEL ASSEMBLY CLUSTERS IN A WATER PIT

This invention relates to a rack for storing fuel assembly clusters in a water pit.

As is known, fuel assembly clusters of nuclear reactors are frequently stored in racks for interim periods in a water pit. In some cases, the racks have been constructed of individual bed plates which are provided with square receiving tubes placed in close together relation on the bottom of the pit. In addition, a cover plate has been secured to the upper ends of the square receiving tubes of each bottom plate for bracing the tubes to each other. Each cover plate has also been connected to the adjacent cover plates via connecting pieces. These constructions, however, require the bed plates to be so large that individual bottom plates with square receiving tubes fastened thereon do not topple over under the influence of horizontal accelerations of an earthquake for which the rack is designed.

Accordingly, it is an object of the invention to provide a rack for the interim storage of fuel assembly clusters which can utilize relatively small bed plates on which receiving tubes can be mounted.

It is another object of the invention to provide a rack for the storage of fuel assembly clusters which can be easily transported by rail or road.

It is another object of the invention to provide a rack for storing fuel assembly clusters which can be passed through an air lock into a containment chamber of a nuclear reactor installation and subsequently lowered into a water pit via suitable lifting devices.

Briefly, the invention provides a rack for storing fuel assembly clusters in a water pit which is comprised of at least two rows of rack elements. Each rack element is constructed of a bed plate and a plurality of vertically disposed square receiving tubes which are mounted on the bed plate in closely spaced relation to each other. In addition, each tube has an inwardly directed flange adjacent the bed plate and bolts are provided to pass through each flange and the bed plate for bolting the tubes to the bed plate. Still further, the rack has means connecting the adjacent bed plates of the rack elements to each other at least at a fixed height.

The construction of the rack elements is such that the square receiving tubes can be mounted on the bed plates in the shop. Hence, the final assembly of the rack in a water pit can be carried out very quickly.

The means for connecting the adjacent bed plates may include a plurality of horizontally disposed screws. This allows the distances between the tubes to be as small as desired while dispensing with any need for lanes along the individual bed plates.

In addition, suitable guide means can be provided in each bed plate for guiding a respective screw prior to threading of the screw into an adjacent bed plate. This allows the bed plates to be screwed or bolted together in a simple and secure manner. For example, the guide means may be in the form of cylindrical bushings. This provides a satisfactory assembly guide for the screws and the bushing itself can be fastened by means of a pair of screws to the bed plate in a simple manner.

Each rack element may also be provided with a plurality of spacers at the upper end of each tube in order to space the adjacent tubes apart. These spacers can easily be adapted to the production-related differences of the dimensions of the square receiving tubes. Further, each spacer may include a guide surface which faces into a tube for guiding a fuel assembly cluster relative to the tube. Thus, separate guides for inserting the fuel assembly clusters are unnecessary.

These and other objects and advantages of the invention will become more apparent from the following detailed description and appended claims taken in conjunction with the accompanying drawings in which:

FIG. 1 schematically illustrates a vertical cross-sectional view through a water pit with a rack according to the invention therein;

FIG. 2 illustrates a fragmentary side view, partly in cross-section, of a rack element according to the invention;

FIG. 3 illustrates a view in an upper section taken along line III—III of FIG. 2 and, in a lower section, a view taken on line III'—III' of FIG. 2;

Figure 1:
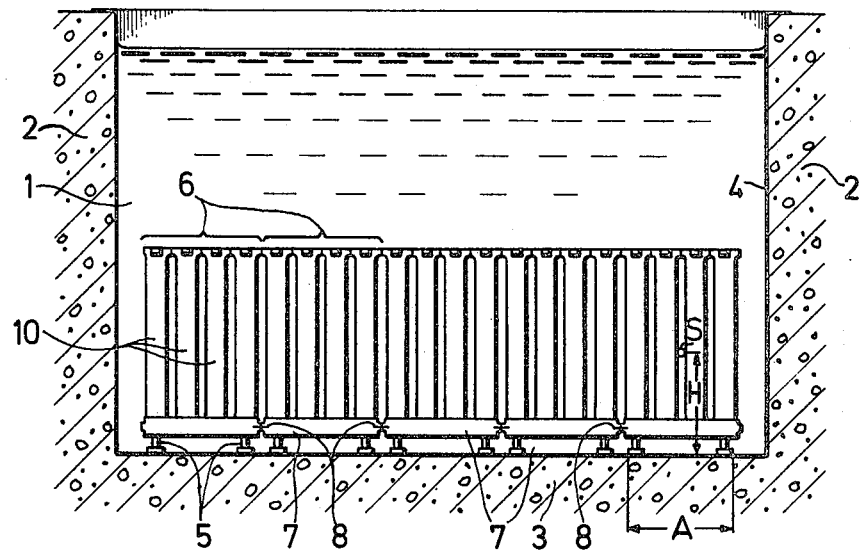

Referring to FIG. 1, a pit 1 for receiving a rack for the storage of fuel assembly clusters is formed by concrete walls 2 and a concrete bottom 3. The pit 1 is lined with a lining 4 of stainless steel. As shown, a plurality of rows of rack elements 6 (for example 5 rows) are disposed on the bottom of the pit 1 via base screws 5.

As shown in FIGS. 1 and 2, each rack element 6 is constructed of a bed plate 7 and a plurality of vertically disposed square receiving tubes 10 which are mounted in closely spaced relation to each other on the bed plate 7. In addition, suitable means are provided for connecting the adjacent bed plates 7 to each other at points 8 at least at a fixed height (i.e. in fixed vertical relation to each other) above the bottom of the pit 1. As illustrated, twenty square receiving tubes 10 are mounted on each bed plate 7 in four rows of 5 tubes. It should be noted that the tubes 10 are shown considerably shortened in FIG. 1.

Referring to FIGS. 2 and 3, each bed plate 7 is constructed of a horizontal plate 12, two peripheral vertical longitudinal ribs 13 extending along the long sides of the plate 12, two peripheral vertical cross ribs 15, two inner longitudinal ribs 14 parallel to the longitudinal ribs 13, and four inner cross ribs 16 which are parallel to the cross ribs 15 and are uniformly distributed over the length of the plate 12. The plate 12 is divided into twenty square areas 20, with each of which areas 20 receives a tube 10. Each area 20 includes a central hole 21 and four peripheral holes 22, which are provided in the plate 12. At the four corners of the bed plate 7 and in the center of the long sides, a rectangular plate 25 each is welded to the lower edge of the ribs 13 to 16. These six plates 25 each have a central tapped hole 26 and four through holes 27 aligned with the holes 22 of the plate 12 in the respective area 20 located above.

The base screws 5 are mounted in the tapped holes 26 of the plates 25 and each screw 5 has a plate-like head 53 and a hexagonally shaped shoulder 54. Two bosses 31 are welded to the outside of each of the two outer longitudinal ribs 13 at the height of an upper horizontal plane 30. In the same manner, but at the height of a lower horizontal plane 34, two bosses 35 each are attached to the outside of the two outer cross ribs 15.

Central through holes 38 are formed in one of the two longitudinal ribs 13, in one of the two cross ribs 15, in the bosses 31, 35, respectively, and these ribs themselves, while the four other bosses 31 and 35 as well as the two ribs welded thereto each have a central tapped hole 39. The inner longitudinal ribs 14 and the inner cross ribs 16 are provided between the respective opposite through holes 38 and the tapped holes 39 between the respective opposite through holes 38 and the tapped holes 39, with through holes 40 coaxially to the corresponding holes 38, 39. The diameter of the holes 40 corresponds to the core diameter of the tapped holes 39.

Figure 4:
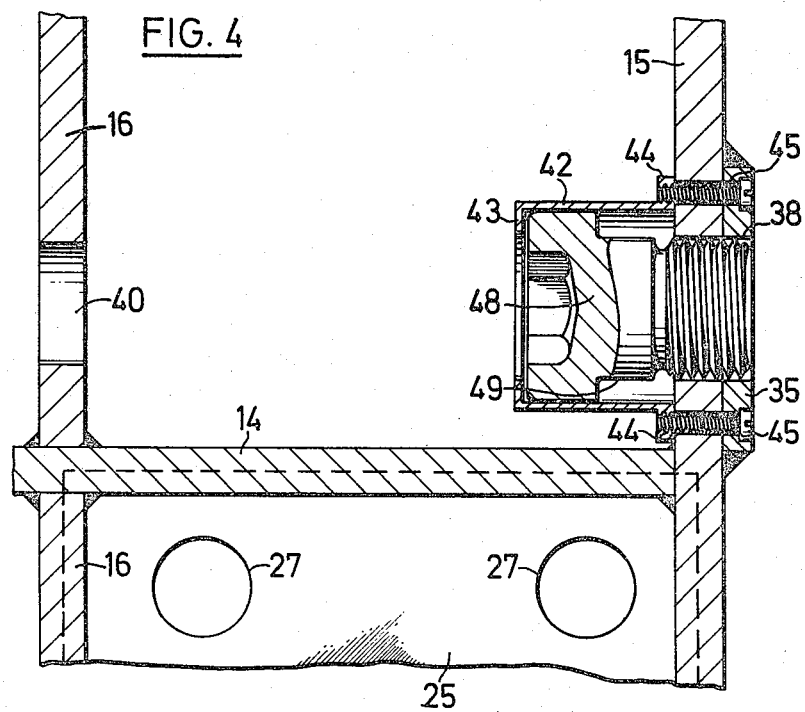
FIG. 4 illustrates an enlarged horizontal cross-sectional view taken along line IV—IV of FIG. 2.

On the inside of the outer longitudinal rib 13 and the cross rib 15 provided with the through holes 38, a guide means in the form of a cylindrical bushing 42 having an inward-directed collar 43 and two outward-directed fastening tabs 44, is arranged coaxially to the holes 38 (FIG. 4). The fastening tabs 44 each have a tapped hole with which a fastening screw 45 engages. Each screw 45 passes through the bosses 31, 35, respectively, and the head of each is counter-sunk in the boss 31, 35.

The means for connecting adjacent bed plates 7 together are in the form of cap screws 48 which are horizontally disposed and guided within a bushing 42. Each cap screw 48 passes through a rib 15 and boss 31, 35 in slidable relation and has a cylindrical fitting surface 49 near a socketed screw head.

Referring to FIG. 2, each tube 10 consists of an outer square tube 60, an inner lining tube 61 and an insert 62 of a boron-aluminum alloy tightly enclosed between the tubes 60, 61. Each tube 10 has four triangular inwardly directed flanges or flange segments 65 which are welded to the base end. Each flange segment 65 has a tapped hole aligned with the holes 22 of the plate 12 for receiving the bolts or cap screws 66 (FIG. 3) for bolting of the tube 10 to the bed plate 7.

A plurality of spacers in the form of profiled bar sections 70 are welded to the upper end of the square receiving tubes 10 on the outside of each of the four sides of the tube 10. In the welded-on condition, these profiled bar sections 70 have an outer fitting surface 71, an upper inner bevel 72 and a lower inner bevel 73. The thickness b of the profiled bar sections 70 is chosen so that the fitting surfaces 71 of adjacent square receiving tubes 10 face each other with only little clearance. Added over the three or four clearances of a rack element, a maximum play in the order of 1 millimeter (mm) is allowed.

The upper bevels 72 serve as a guide surface for centering fuel assembly clusters (not shown) when the clusters are lowered into the square receiving tube 10. The lower bevels 73 act as guide surfaces to prevent the fuel assembly clusters from getting hooked when the clusters are removed from the square receiving tubes 10.

The assembly and installation of the storage rack takes place as follows:

The welded and heat-treated bed plates 7 are straightened if necessary and, if desired, machined plane at their surface by a chip-removing process. Then the through holes 38 and the tapped holes 39 are made and the bosses 31, 35 are face-milled.

The profiled bar sections 70 are then welded to the square receiving tubes 10 on the outside, after the bar sections 70 have been machined to the correct thickness on the basis of the desired small clearance, or have been selected corresponding to this thickness. Next, the square receiving tubes 10 are bolted to the bed plate 7. The holes 27 in the plates 25 then serve for bringing-through and screwing-fast the cap screws 66. Thereupon, the four bushings 42, each of which contains a cap screw 48, are fastened on the inside of the longitudinal rib 13 and the cross rib 15, respectively, by means of the screws 45, so that the horizontal axis of each screw 48 is aligned with the corresponding through hole 38. Next, the six base screws 5 are screwed into the tapped holes 26 of the plates 25. A cluster of twenty receiving tubes 10 is then tied together by ropes or via four pieces of strip steel which are bent at right angles and screwed together at the ends. One rack element 6 is thus prepared for rail or road transport. Each rack element 6 can also be transported in this condition through locks into a known containment of a nuclear reactor installation. At this time, the rack element 6 is raised, the ties are removed and the rack element 6 is lowered by means of available lifting facilities into the pit 1, which is not yet filled with water. Each of the newly arriving rack elements 6 is pushed in place and levelled by adjusting the base screws 5. Thereafter, newly added element 6 is screwed to the adjoining elements 6 by means of the cap screws 48 i.e. the cap screws 48 are threaded into engagement with a tapped hole 39 of an adjacent rib. For this purpose, a rod provided at both ends with hexagonal surfaces is inserted through the tapped hole 39 in the opposite rib of the same bed plate and through the through holes 40 in the ribs located in between into the internal hexagonal socket of the screw 48. In order to utilize the space of the pit 1 as much as possible, these rods are left behind in the respective element 6 in the case of the last rows of the rack elements 6.

The rack elements 6 have an overall height so large and a base spacing so small that they would tip over in the event of a design earthquake if they were erected individually and free-standing. In mathematical terms, this means that $$2 H/A > \tan \rho,$$

where according to FIG. 1, H denotes the distance of the center of gravity S of a rack element 6 above the lining 4 at the bottom 3 of the pit; A the outside distance of two base screws 5 as seen in the lengthwise direction of the rack element; and $\rho$ the friction angle. Through the simple, in principle joint-like connection of the bed plates 7, the tilting moments of respective adjacent rack elements 6 are taken up by vertical forces and the outermost rack elements 6 are braced against each other at the upper ends of the square receiving tubes 10. The concept is therefore realizable without a rigid connection proper between the individual bed plates 7.

However, the concept doe not preclude the rack elements 6 from moving around in the pit 1 if the earthquake accelerations, expressed as multiples of the free-fall accelerations g, are larger than the meant tangent of the friction angle $\rho$. Such a travel motion, however, is insignificant in most cases, and can be intercepted by buffer elements, (not shown) in the area of the pit circumference. The buffer elements may, for instance, be in the form of tubes placed in the gap between the bed plates 7 and the pit wall 2.

Alternatively, the bed plates 7 can be connected to each other by means of horizontal slots and interengaging keys or by joints with a horizontal axis. It is important above all that the connection be able to transmit vertical forces from one bed plate to an adjacent bottom plate. If the friction coefficients of the base screws 5 on the pit bottom 3 differ much, then the connections must also be able to take up horizontal tension forces.

I claim:

1. A rack for storing fuel assembly clusters in a water pit, said rack comprising at least two rows of rack elements, each said rack element having a bed plate, a plurality of vertically disposed square receiving tubes mounted thereon in closely spaced relation to each other, each said tube having an inwardly directed flange adjacent said bed plate, and bolts passing through each flange and said bed plate for bolting said tubes to said bed plate; and means connecting adjacent bed plates of said rack elements to each other at least in fixed vertical relation to each other.

2. A rack as set forth in claim 1 wherein said means includes a plurality of horizontally disposed screws.

3. A rack as set forth in claim 2 which further comprises guide means in each respective bed plate for guiding a respective screw therein prior to threading of said respective screw into an adjacent bed plate.

4. A rack as set forth in claim 3 wherein each guide means is a cylindrical bushing.

5. A rack as set forth in claim 1 which further comprises a plurality of spacers at an upper end of each tube for spacing adjacent tubes apart.

6. A rack as set forth in claim 5 wherein each spacer includes a guide surface facing into a respective tube for guiding a fuel assembly cluster relative to said respective tube.

7. A rack as set forth in claim 1 wherein each said bed plate includes peripheral vertical ribs and said means includes a plurality of horizontally disposed screws mounted in one rack element and threaded into engagement with a respective rib of an adjacent bed plate.

8. A rack as set forth in claim 7 which further comprises guide means in each respective bed plate for guiding a respective screw therein prior to threading of said respective screw into an adjacent bed plate.

9. A rack as set forth in claim 1 wherein each rack element is supported on base screws and wherein the height (H) of the center of gravity of each rack element and the outside distance (A) of two base screws in the lengthwise direction of said rack element are in a relation 2 H/A which is greater than the friction angle of said rack element.

* * * * *

UNITED STATES PATENT AND TRADEMARK OFFICE
CERTIFICATE OF CORRECTION

PATENT NO. : 4,317,702

DATED : March 2, 1982

INVENTOR(S) : HANS AKERET

It is certified that error appears in the above—identified patent and that said Letters Patent is hereby corrected as shown below:

Column 2, line 65, after "and" insert --in--

Column 4, line 48, change "doe" to --does--

Column 4, line 51, change "meant" to --mean--

Signed and Sealed this

Thirteenth Day of July 1982

[SEAL]

Attest:

*Attesting Officer*

GERALD J. MOSSINGHOFF

*Commissioner of Patents and Trademarks*